(12) United States Patent
Resch

(10) Patent No.: US 10,831,381 B2
(45) Date of Patent: Nov. 10, 2020

(54) HIERARCHIES OF CREDENTIAL AND ACCESS CONTROL SHARING BETWEEN DSN MEMORIES

(71) Applicant: International Business Machines Corporation, Armonk, NY (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 15/396,986

(22) Filed: Jan. 3, 2017

(65) Prior Publication Data
US 2017/0289171 A1 Oct. 5, 2017

Related U.S. Application Data

(60) Provisional application No. 62/314,792, filed on Mar. 29, 2016.

(51) Int. Cl.
*G06F 3/06* (2006.01)
*G06F 21/31* (2013.01)
(Continued)

(52) U.S. Cl.
CPC ............ *G06F 3/0619* (2013.01); *G06F 3/061* (2013.01); *G06F 3/0604* (2013.01); *G06F 3/064* (2013.01);
(Continued)

(58) Field of Classification Search
CPC .. H04W 12/06; H04W 12/04; H04L 63/0428; H04L 63/10; H04L 67/1097;
(Continued)

(56) References Cited

U.S. PATENT DOCUMENTS

| | | | |
|---|---|---|---|
| 4,092,732 A | | 5/1978 | Ouchi |
| 5,412,612 A | * | 5/1995 | Oyama ................. G06F 3/0601 365/228 |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Alexander Lagor
*Assistant Examiner* — Howard H. Louie
(74) *Attorney, Agent, or Firm* — James Nock; Andrew D. Wright; Roberts, Calderon, Safran & Cole, P.C.

(57) ABSTRACT

A method includes detecting a change to one or more of: a credential of set of storage units supporting a logical storage vault and access control information for a user group affiliated with the logical storage vault. The method further includes, in response to the detecting, determining, whether the logical storage vault is in a relationship with another logical storage vault. When the logical storage vault is in the relationship, determining whether the logical storage vault is an originating vault or a subservient vault. When the logical storage vault is the originating vault, sending updated access control information to the second set of storage units regarding a change to the access control information. When the logical storage vault is the subservient vault, sending an updated credential of the set of storage units to the computing device regarding a change to the credential of the set of storage units.

14 Claims, 10 Drawing Sheets

(51) Int. Cl.

| | | |
|---|---|---|
| *G06F 11/10* | (2006.01) | |
| *G06F 8/65* | (2018.01) | |
| *G06F 9/48* | (2006.01) | |
| *H04L 29/08* | (2006.01) | |
| *H03M 13/05* | (2006.01) | |
| *H04L 29/06* | (2006.01) | |
| *H04L 29/12* | (2006.01) | |
| *H03M 13/37* | (2006.01) | |
| *H03M 13/15* | (2006.01) | |
| *H03M 13/00* | (2006.01) | |

(52) U.S. Cl.
CPC ............ *G06F 3/067* (2013.01); *G06F 3/0611* (2013.01); *G06F 3/0631* (2013.01); *G06F 3/0635* (2013.01); *G06F 3/0644* (2013.01); *G06F 3/0647* (2013.01); *G06F 3/0659* (2013.01); *G06F 8/65* (2013.01); *G06F 9/485* (2013.01); *G06F 9/4881* (2013.01); *G06F 11/1076* (2013.01); *G06F 11/1092* (2013.01); *G06F 21/31* (2013.01); *H03M 13/05* (2013.01); *H04L 61/10* (2013.01); *H04L 61/20* (2013.01); *H04L 63/08* (2013.01); *H04L 63/104* (2013.01); *H04L 63/108* (2013.01); *H04L 67/1097* (2013.01); *H04L 67/28* (2013.01); *G06F 2221/2133* (2013.01); *H03M 13/1515* (2013.01); *H03M 13/373* (2013.01); *H03M 13/616* (2013.01)

(58) Field of Classification Search
CPC ....... H04L 63/101; H04L 61/10; H04L 61/20; H04L 63/08; H04L 63/104; H04L 63/108; H04L 67/28; G06F 3/0482; G06F 3/067; G06F 3/0689; G06F 3/0619; G06F 3/0604; G06F 3/061; G06F 3/0611; G06F 3/0631; G06F 3/0635; G06F 3/064; G06F 3/0644; G06F 3/0647; G06F 3/0659; G06F 8/65; G06F 9/485; G06F 9/4881; G06F 11/1076; G06F 11/1092; G06F 21/31; G06F 2221/2133; H03M 13/05; H03M 13/1515; H03M 13/373; H03M 13/616

See application file for complete search history.

(56) References Cited

U.S. PATENT DOCUMENTS

| | | | |
|---|---|---|---|
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,249,219 B1* | 7/2007 | Mowat ............... G06F 12/0813 | |
| | | | 711/113 |
| 7,272,613 B2 | 9/2007 | Sim et al. | |
| 7,389,393 B1* | 6/2008 | Karr ..................... G06F 3/0613 | |
| | | | 711/103 |
| 7,636,724 B2 | 12/2009 | de la Torre et al. | |
| 8,213,297 B2* | 7/2012 | Bennah ................. H04L 49/40 | |
| | | | 370/217 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037033 A1* | 2/2003 | Nyman ............. H04L 29/12264 | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0148590 A1* | 7/2004 | Lapitski .............. G06F 11/3688 | |
| | | | 717/124 |
| 2004/0215998 A1 | 10/2004 | Buxton et al. | |
| 2004/0228493 A1 | 11/2004 | Ma | |
| 2004/0250034 A1* | 12/2004 | Yagawa ............. G06F 11/2058 | |
| | | | 711/162 |
| 2005/0027718 A1* | 2/2005 | Sakaguchi ........ G06F 17/30067 | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0169118 A1* | 8/2005 | You ................. G11B 20/00086 | |
| | | | 369/30.05 |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0148402 A1* | 7/2006 | Hagiwara ............. H04L 9/3271 | |
| | | | 455/41.1 |
| 2006/0155650 A1* | 7/2006 | Oh ...................... G06F 21/10 | |
| | | | 705/57 |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0106894 A1* | 5/2007 | Zhang ................. H04L 63/0428 | |
| | | | 713/170 |
| 2007/0174192 A1 | 7/2007 | Gladwin et al. | |
| 2007/0180308 A1* | 8/2007 | Zohar ................. G06F 11/1435 | |
| | | | 714/6.23 |
| 2007/0214285 A1 | 9/2007 | Au et al. | |
| 2007/0226779 A1* | 9/2007 | Yokomitsu ............ H04L 9/0869 | |
| | | | 726/2 |
| 2007/0234110 A1 | 10/2007 | Soran et al. | |
| 2007/0249286 A1* | 10/2007 | Ma ......................... H04L 63/08 | |
| | | | 455/41.3 |
| 2007/0283167 A1 | 12/2007 | Venters et al. | |
| 2009/0094251 A1* | 4/2009 | Gladwin .............. G06F 17/30067 | |
| 2009/0094318 A1 | 4/2009 | Gladwin et al. | |

(56) References Cited

U.S. PATENT DOCUMENTS

| | | | |
|---|---|---|---|
| 2010/0023524 A1 | 1/2010 | Gladwin et al. | |
| 2011/0296066 A1* | 12/2011 | Xia | G06F 13/4022 710/110 |
| 2014/0365595 A1* | 12/2014 | Yamada | H04L 12/433 709/211 |
| 2015/0286540 A1* | 10/2015 | Dain | G06F 11/1469 711/103 |
| 2015/0318993 A1* | 11/2015 | Hamlin | H04L 63/0428 713/169 |
| 2016/0062836 A1* | 3/2016 | Mu | G06F 11/2069 714/6.23 |
| 2016/0182493 A1* | 6/2016 | Volini | H04L 63/08 713/158 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

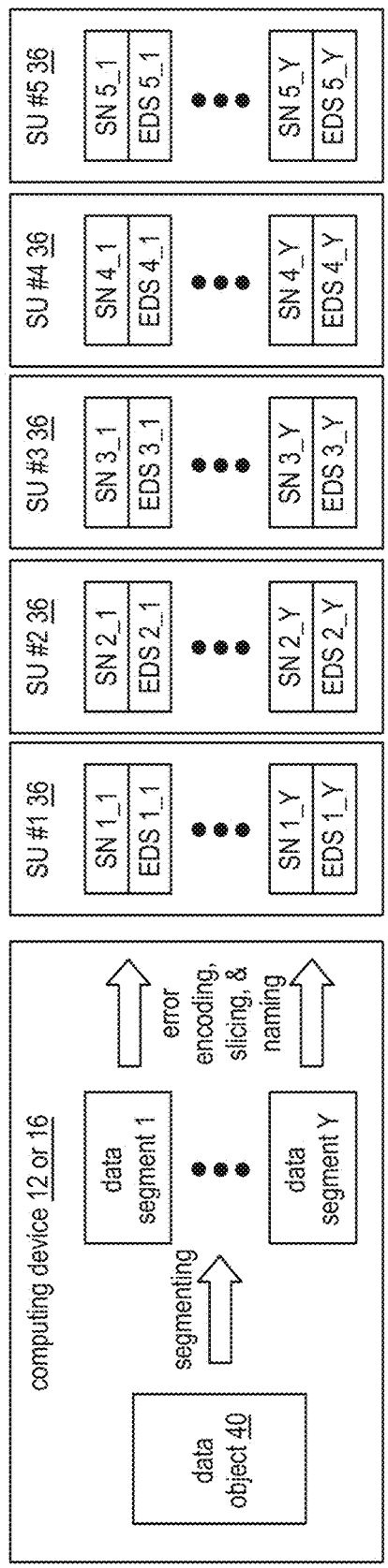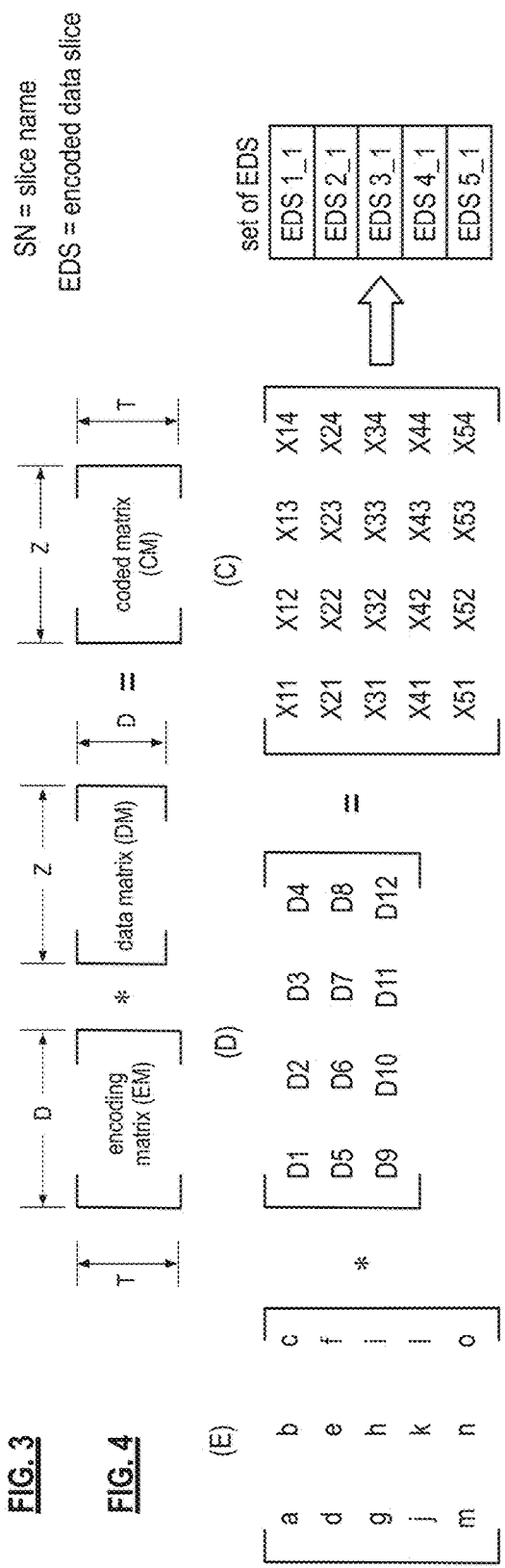

| user pool | vault | service provider | DSN Mem | DSN Type | DSN access |
|---|---|---|---|---|---|
| 1 | vault #1 | entity 1 | DSN #1 | private | entity 1 |
| 2 | vault #2 | entity 2 | DSN #2 | public | entity 2 |
| 3 | vault #3 | entity 2 | DSN #3 | public | entity 1 & 2 |
| 4 | vault #4 | entity 1 | DSN #4 | private | entity 1 |
| 5 | vault #5 | entity 1 | DSN #5 | public | entity 1 & 2 |
| 6 | vault #6 | entity 2 | DSN #6 | public | entity 1 |
| 7 | vault #7 | entity 1 | | | |
| 8 | vault #8 | entity 1 | | | |

FIG. 12

HIERARCHIES OF CREDENTIAL AND ACCESS CONTROL SHARING BETWEEN DSN MEMORIES

CROSS REFERENCE TO RELATED PATENTS

This application claims priority pursuant to 35 U.S.C. § 119(e) to U.S. Provisional Application No. 62/314,792, entitled "SELECTING A PROCESSING UNIT IN A DISPERSED STORAGE NETWORK," filed Mar. 29, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is also known, one or more internet storage systems may maintain logical storage vaults where a logical storage vault is affiliated with a group of users. Logical storage vaults may be owned by the same entity or entities. Those entities may wish to control user access information among its vaults located on the same or different systems.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 12 is a schematic block diagram of an example of vault affiliations within one or more DSN memories in accordance with the present invention;

DETAILED DESCRIPTION OF THE INVENTION

Figure 1:
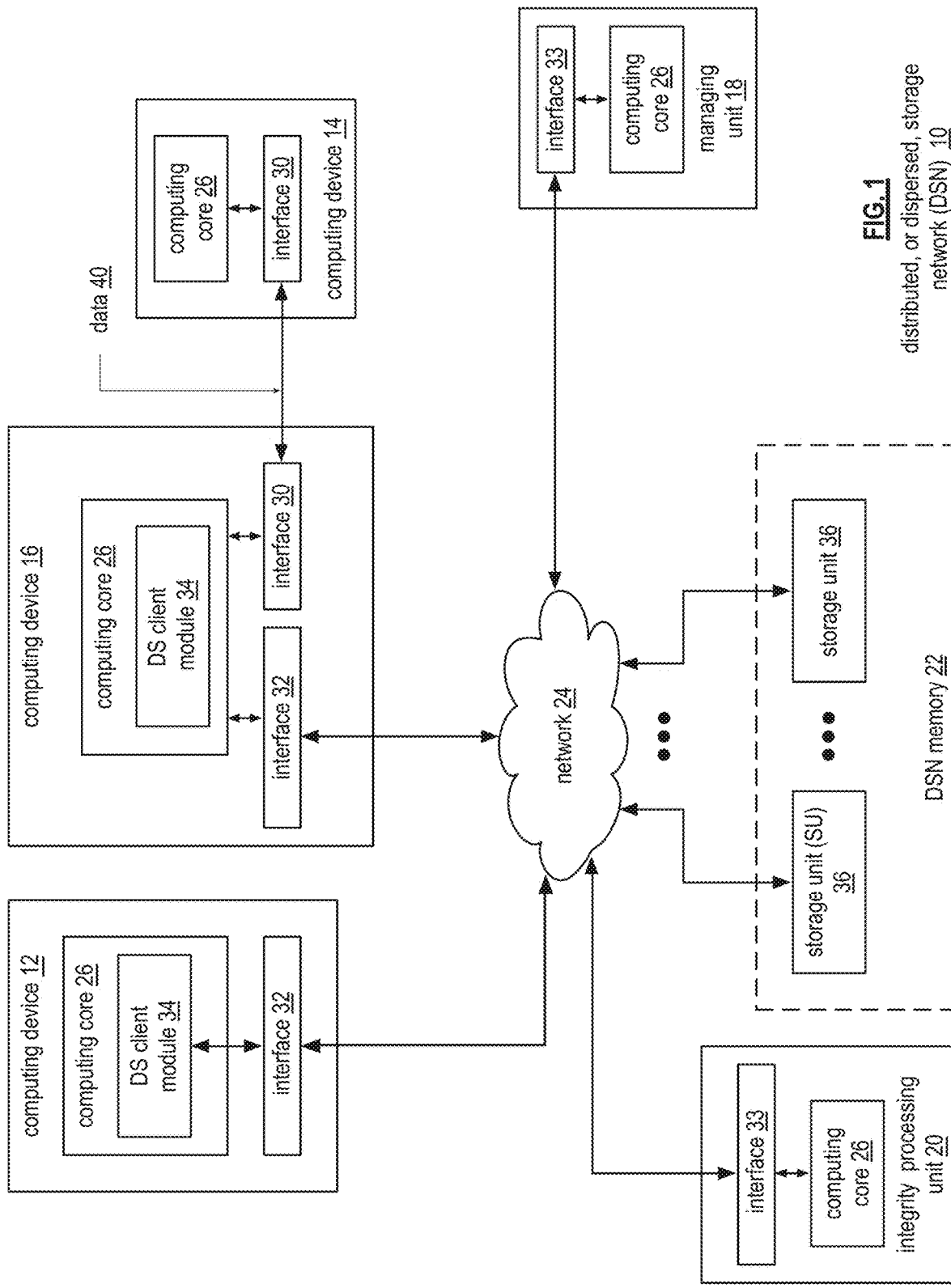
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
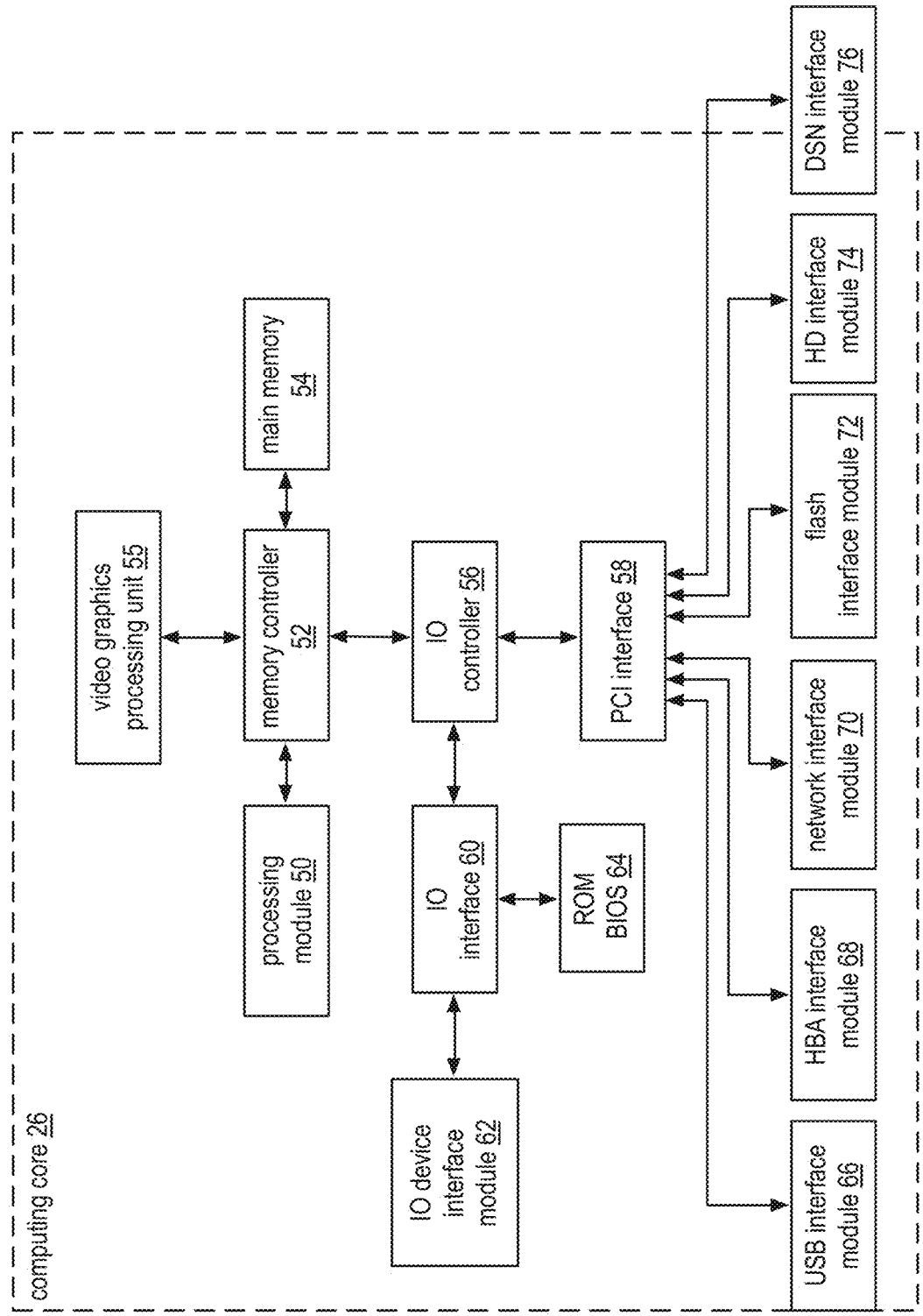
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the 10 device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
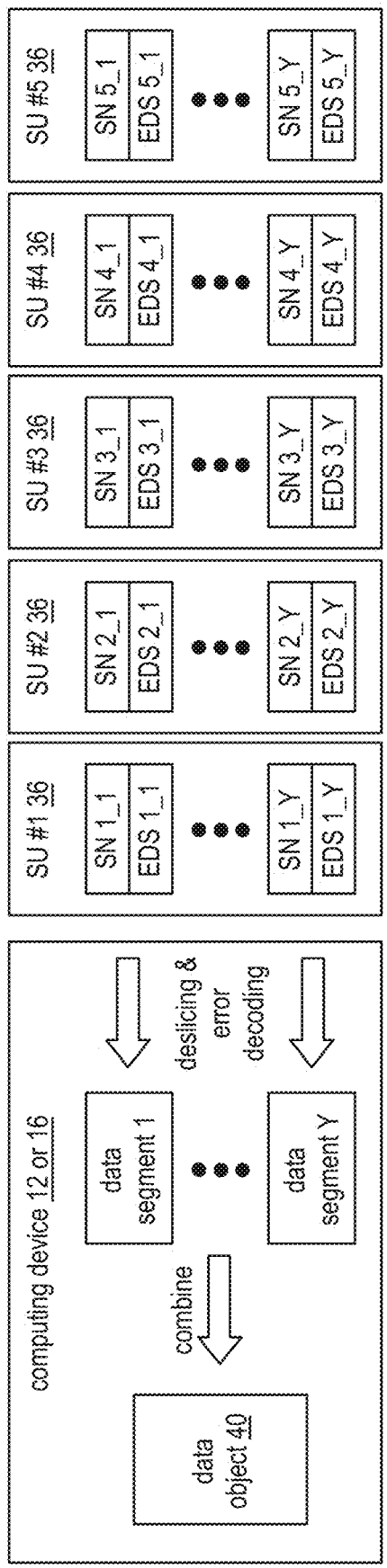
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
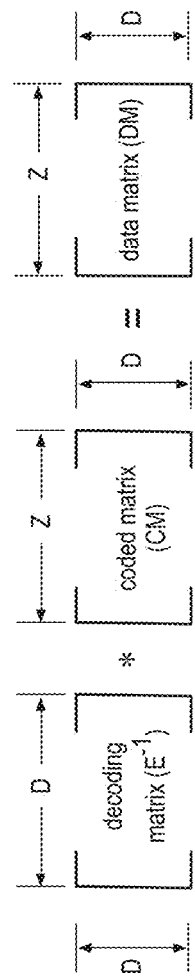
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
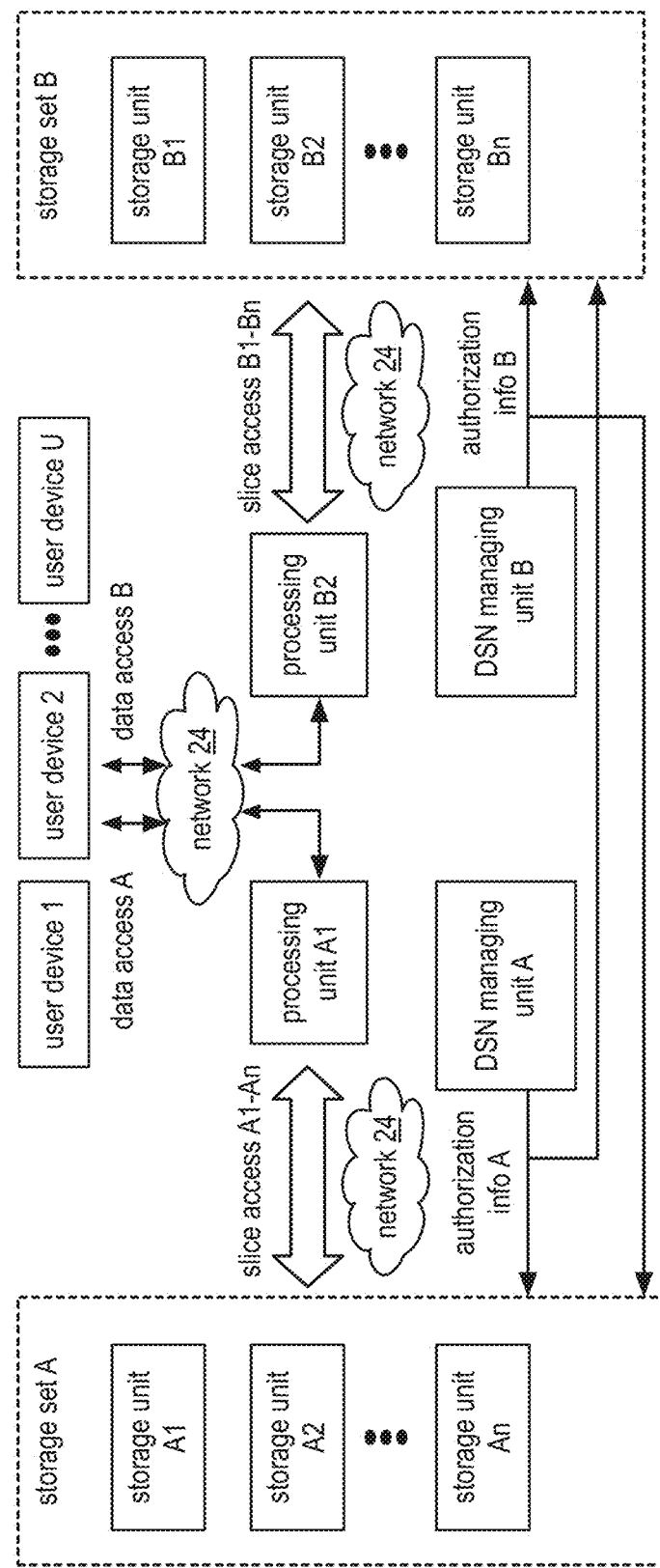
FIG. 9 is a schematic block diagram of another embodiment of a dispersed storage network in accordance with the present invention.

FIG. 9 is a schematic block diagram of another embodiment of a dispersed storage network (DSN) that includes storage sets A-B, a plurality of user devices 1-U, the network 24 of FIG. 1, processing units A1, B2, and DSN managing units A-B. The storage set A includes a set of storage units A1-An and the storage set B includes a set of storage units B1-Bn. Each storage unit may be implemented utilizing the storage unit 36 of FIG. 1. Each processing unit may be implemented utilizing the computing device 16 of FIG. 1. Each DSN managing unit may be implemented utilizing the managing unit 18 of FIG. 1. Each user device may be implemented utilizing one or more of the computing device 12 of FIG. 1 and the computing device 14 of FIG. 1. The storage set A, the processing unit A1, and the DSN managing unit A form an A-side DSN and the storage set B, the processing unit B2, and the DSN managing unit B form an B-side DSN. A function of the DSN includes obtaining authorization information.

In an example of operation of the obtaining of the authorization information, for each virtual vault of a plurality of storage vaults associated with each DSN A-B, each storage unit of each set of storage units determines a source of authorization information based on an authorization hierarchy approach, where each virtual storage vault is associated with one or more user devices, and where a given user device may be associated with at least one virtual storage vault from each of the storage sets.

The authorization information includes one or more of permissions of an individual user device, permissions of a group of user devices, associations of vaults to storage sets, and the authorization hierarchy approach. The authorization hierarchy approach includes a unidirectional approach and a bidirectional approach. The unidirectional approach includes a first vault of a first set of storage units associated with permissions sourced from a second managing unit, where the second managing unit sources permissions for a second vault of a second set of storage units (e.g., the DSN managing unit B sources permissions for vaults associated with the storage set B and also for some vaults associated with the storage set A). The bidirectional approach includes each managing unit sourcing permissions for a vault associated with storage units of an associated set of storage units and shares the permissions with storage units of the other set of storage units for utilization by corresponding vaults (e.g., when either DSN managing unit provides permissions they are shared by both storage sets for the same vaults).

The determining of the source of the authorization information includes one or more of identifying a managing unit associated with the source of permissions for the virtual storage vault in accordance with the authorization hierarchy approach. For example, storage unit B1 associates permissions for a first vault of a DSN B when the first vault is to be subservient to at least one associated vault associated with the DSN A.

Having determined the source of the authorization information, each storage unit obtains the authorization information from the source of the authorization information. For example, the storage unit B1 obtains permissions from the DSN managing unit A for a first vault when the first vault is to be subservient to at least one associated vault associated with the DSN A.

Having obtained the authorization information, each storage unit utilizes the authorization information when processing a slice access request. As the utilization example, the processing unit B2 receives a data access B from the user device 1 and issues slice access requests B1-Bn to the storage set B, where each storage unit B1-Bn identifies a vault from the received slice access request. Having identified the vault, each storage unit B1-Bn utilizes obtain permissions for the identified vault. For example, rejecting the slice access request or allowing the slice access request based on the permissions for the user device 1 and the vault associated with the storage set B, where the permissions were obtained from the DSN managing unit A.

Figure 10:
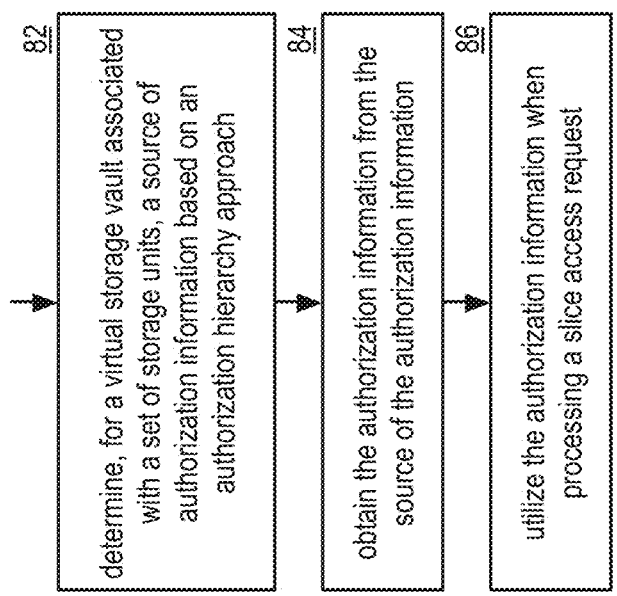
FIG. 10 is a flowchart illustrating an example of obtaining authorization information in accordance with the present invention.

FIG. 10 is a flowchart illustrating an example of obtaining authorization information. The method begins with step 82 where a processing module (e.g., of a storage unit) determines, for a virtual storage vault associated with a set of storage units, a source of authorization information based on an authorization hierarchy approach. The determining includes one or more of obtaining the authorization hierarchy approach and identifying a managing unit associated with a source of authorization information for the virtual storage vault in accordance with the authorization hierarchy approach. For example, a storage unit associates permissions for a first vault of the set of storage units when the first vault is to be subservient to at least one associated vault associated with another set of storage units when the hierarchy includes a subservient relationship.

The method continues at step 84 where the processing module obtains the authorization information from the source of the authorization information. For example, the processing module obtains permissions from a managing unit associated with the other set of storage units for the first vault for the first vault is to be subservient to at least one corresponding vault associated with the managing unit.

The method continues at step 86 where the processing module utilizes the authorization information when processing a slice access request. For example, a processing unit receives a data access request from a user device an issue slice access requests to the storage set, each storage unit identifies a vault from the received slice access request, each storage unit utilizes obtained permissions for the identified vault (e.g., reject or allow based on permissions for the user device and the vault associated with the storage set, where the permissions were obtained from the managing unit associated with the other set of storage units).

Figure 11:
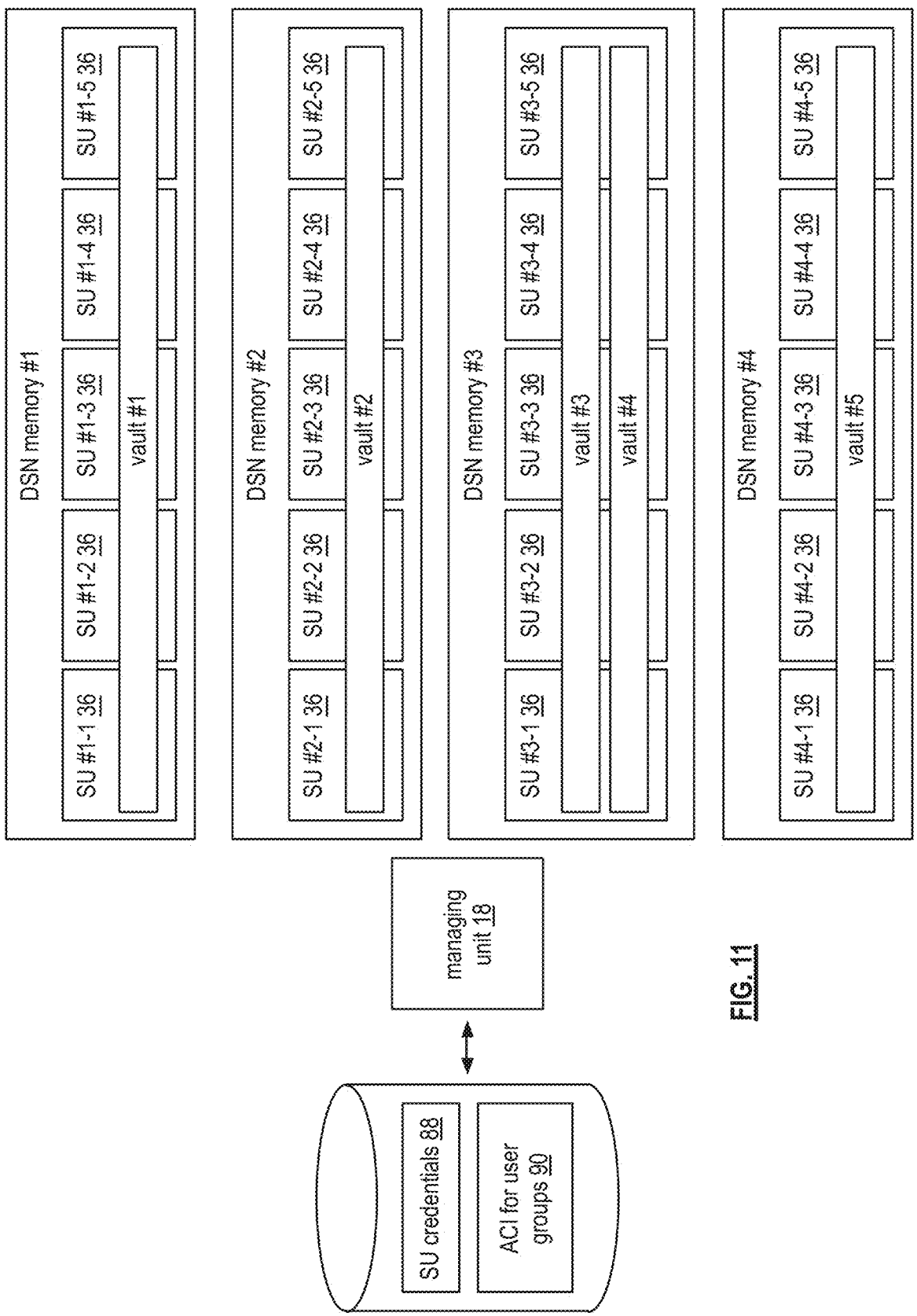
FIG. 11 is a schematic block diagram of multiple dispersed storage network (DSN) memories in accordance with the present invention.

FIG. 11 is a schematic block diagram of multiple dispersed storage network (DSN) memories. Each of the DSN memories 1-4 is affiliated with a set of storage units. The DSN memories may be in the same DSN, in different DSNs, or any combination thereof. One or more DSN memories may be administered and operated by different entities. For example, one DSN memory may be administered by a public service and one by a private company. Each set of storage units affiliated with the DSN memories supports one or more logical storage vault affiliated with one or more user groups. As shown, DSN memory #1 is affiliated with storage units (SUs) #1-1 through #1-5. SUs #1-1 through #1-5 support logical storage vault #1. DSN memory #2 is affiliated with storage units (SUs) #2-1 through #2-5. SUs #2-1 through #2-5 support logical storage vault #2. DSN memory #3 is affiliated with storage units (SUs) #3-1 through #3-5. SUs #3-1 through #3-5 support logical storage vaults #3 and #4. DSN memory #4 is affiliated with storage units (SUs) #4-1 through #4-5. SUs #4-1 through #4-5 support logical storage vault #5. Logical storage vaults within different DSN memories may be owned by the same entity or entities (e.g., the same service provider(s)) and may wish to synchronize access controls and credentials across one or more DSN memories. For example, a first entity may own logical storage vault #1 (of DSN memory #1) and logical storage vault #5 (of DSN memory #4) and may wish to synchronize access controls and credentials across DSN memories #1 and #5.

This example includes managing unit 18 which is capable of detecting changes in storage unit credentials 88 and access control information (ACI) for user groups 90. The managing unit 18 may be the managing unit of one or more DSNs. Storage unit credentials 88 may include one or more of a signed certificate, a key, an authorization token, a user name and password pair, an authorization time frame indicator, a permission list, a type of services granted, and an encryption key. Access control information may include authentication information, permission regarding one or more of storing data, reading data, deleting data, and retrieving a list of slice names, and one or more security parameters. The security parameters may include an encryption/decryption scheme, one or more encryption keys, a key generation scheme, and/or a data encoding/decoding scheme.

In an example of operation, the managing unit 18 detects a change to a credential of a set of storage units supporting a logical storage vault and/or a change to access control information for a user group affiliated with the logical storage vault. For example, the managing unit may detect that a new user was added to a user group, a user was disabled from the user group, or user access permissions were altered in some way. Such a change would require an update to the access control information regarding user access (e.g., if a new user is added, that user would be granted permission to access the logical storage vault) as well as an update to the storage unit credentials (e.g., if a new user is added, that user would need storage unit credentials from the storage units it wishes to access and it would need to be added to the storage units' permissions list).

When the managing unit 18 detects a change, the managing unit determines whether the logical storage vault is in a relationship with another logical storage vault. This determination may be done with a lookup. When the logical storage vault is in the relationship with another logical storage vault, the managing unit 18 determines whether the logical storage vault is an originating vault or a subservient vault with respect to the other logical storage vault. When the logical storage vault is the originating vault, the set of storage units affiliated with the logical storage vault (the originating vault) sends updated access control information to the second set of storage units affiliated with the other logical storage vault (the subservient vault) regarding a change to the access control information. Sending updated access control information to the second set of storage units allows a user group affiliated with the originating logical storage vault to access the subservient logical storage vault. Any changes to the originating vault's access control information are thus extended to subservient vault(s).

When the logical storage vault is the subservient vault, the set of storage units send an updated credential of the set of storage units to the managing unit 18 regarding a change to the credential of the set of storage units. Sending an updated storage unit credential to the managing unit allows the users affiliated with the originating vault to access the subservient vault by using the storage unit credential associated with the subservient vault. Any changes to the subservient vault's storage credentials are thus extended to originating vault(s). The managing unit may determine that the logical storage vault is in multiple relationships with other storage vaults. In that case, the managing unit will determine whether the logical storage vault is an originating or subservient vault in accordance with each relationship.

According to this example, three logical storage vault relationships can exist: 1) fully isolated, 2) unidirectional, and 2) bidirectional. A fully isolated logical storage vault is neither an originating nor a subservient vault. Therefore, if the managing unit detects a change in the access control information or the storage unit credentials of an isolated vault, the isolated vault would not forward updated information to any other vault. The isolated vault would simply keep track of its own updated access control information and storage unit credentials.

Alternatively, the managing unit may determine that a logical storage vault is in a unidirectional relationship with the another logical storage vault. In a unidirectional relationship, one logical storage vault (an originating storage vault) is permitted to access another logical storage vault but the relationship is not reciprocal (i.e., the other logical storage vault (the subservient vault) cannot similarly access the logical storage vault). The managing unit may determine that the logical storage vault is the originating vault when, in accordance with the unidirectional relationship, a group of user devices affiliated with the logical storage vault have access privileges to the other logical storage vault. The managing unit may determine that the logical storage vault is the subservient vault when, in accordance with the unidirectional relationship, a second group of user devices affiliated with the other logical storage vault have access privileges to the logical storage vault. The logical storage vault (the originating vault) in a unidirectional relationship will exchange access control information updates with the other logical storage vault (the subservient vault) and the other logical storage vault will exchange updated storage unit credentials with the logical storage vault.

Alternatively, the managing unit may determine that a logical storage vault is in a bidirectional relationship with the another logical storage vault. In a bidirectional relationship, a logical storage vault is determined to be both the originating vault and the subservient vault in relation to the another logical storage vault. A logical storage vault is determined to be both the originating vault and the subservient vault when a group of user devices affiliated with the logical storage vault have access privileges to the other logical storage vault and a second group of user devices affiliated with the other logical storage vault have access privileges to the logical storage vault. Therefore, in a bidirectional relationship, a logical storage vault may access the other logical storage vault and the other logical storage can likewise access the logical storage vault. Logical storage vaults in a bidirectional relationship will exchange access control information updates and storage credential updates.

FIG. 12 is a schematic block diagram of an example of vault affiliations within one or more DSN memories. This example shows a plurality of logical storage vaults 1-8 that are affiliated with user pools 1-8 respectively. Each vault is owned and administered by one or more entities (e.g., service provider(s)). For example, entity 1 owns logical storage vaults 1, 4, 5, 7, and 8, shown highlighted in gray, while entity 2 owns vaults 2, 3, and 6. Further, each logical storage vault is affiliated with one or more DSN memories. As depicted here, logical storage vault 1 is affiliated with DSN memory 1, logical storage vault 2 is affiliated with DSN memory 2, logical storage vaults 3 and 4 are affiliated with DSN memory 3, logical storage vault 5 is affiliated with DSN memory 4, logical storage vault 6 is affiliated with DSN memory 5, and logical storage vaults 7 and 8 are affiliated with DSN memory 6.

DSN memories may be in the same DSN, in different DSNs, or any combination thereof. Here, each DSN memory is shown as a separate DSN. The DSN memories may be different types (e.g., public or private) and may be accessed by one or more entities. This example shows DSN memories 1 and 4 as private DSNs and DSN memories 2, 3, 5, and 6 as public DSNs. Entity 1 has access to DSN memories 1, 4, and 6 while entity 2 has access to DSN memory 2. Entities 1 and 2 share access to DSN memories 3 and 5. Relationships between the logical storage vaults and DSN memories will be discussed in more detail with reference to FIG. 13.

Figures 13, 14:
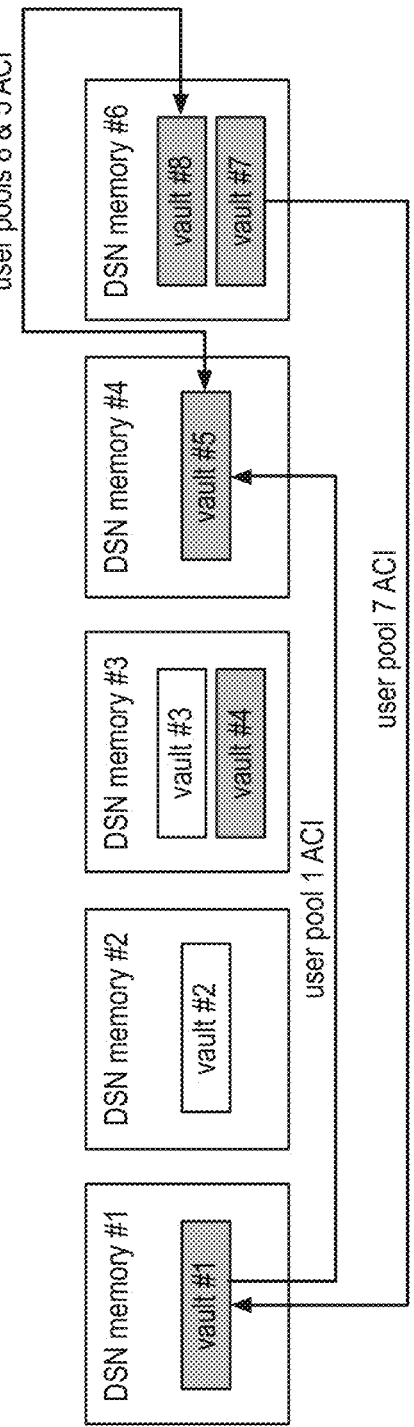
FIG. 13 is an example of logical storage vault relationships in accordance with the present invention.
FIG. 14 is a schematic block diagram of an example of logical storage vault relationships in accordance with the present invention.

FIG. 13 is an example of logical storage vault relationships. This example includes the user pools 1-8, logical storage vaults 1-8, and DSN memories 1-6 of FIG. 12. Entity 1 of FIG. 12 owns logical storage vaults 1, 4, 5, 7, and 8 (shown highlighted in gray). This example includes a table of example relationships between the logical storage vaults owned by entity 1 as well as the DSN memory relationships developed by those logical storage vault relationships. Here, the managing unit has determined (e.g., through a lookup) that logical storage vault 1 is in a unidirectional relationship with logical storage vault #5. For example, vault 1 may be overloaded and wish to expand its storage into vault 5. Vault 1 would then send access control information to vault 5 to establish the relationship and facilitate access control updates. In a unidirectional relationship, a logical storage vault (an originating storage vault) is permitted to access another logical storage vault but the relationship is not reciprocal (i.e., the other logical storage vault (a subservient vault) cannot similarly access the logical storage vault). Here, the managing unit has determined that vault 1 is the originating vault and vault 5 is the subservient vault because, in accordance with the unidirectional relationship, user pool 1 has access privileges to vault 5. Therefore, according to this relationship, user pool 1 has access privileges to vaults 1 and 5 whereas user pool 5 only has access privileges to only vault 5 and not user pool 1.

The managing unit has further determined that vault 4 is isolated and is not in a relationship with other vaults. Therefore, user pool 4 has access to vault 4. The managing unit has further determined that vaults 5 and 8 are in a bidirectional relationship. In a bidirectional relationship, a logical storage vault is determined to be both the originating vault and the subservient vault in relation to the another vault. For example, it may be advantageous for vaults 5 and 8 to join storage resources. Here, the managing unit has determined vaults 5 and 8 to be both the originating and the subservient vaults in relationship to each other because user pool 5 has access privileges to vault 8 and user pool 8 has access privileges to vault 5. Therefore, user pool 5 has access privileges to vaults 5 and 8 and user pool 8 has access privileges to vaults 8 and 5. The managing unit has further determined that vaults 7 and 1 are in a unidirectional relationship where vault 7 is the originating vault. Therefore, user pool 7 has access privileges to vaults 1 and 7 whereas user pool 1 has access privileges to vault 1.

In summary, user pool 1 has access privileges to vaults 1 and 5 (via a unidirectional relationship), user pool 4 has access privileges to vault 4 (via an isolated relationship), user pool 5 has access privileges to vaults 5 and 8 (via a bidirectional relationship), user pool 7 has access privileges to vaults 7 and 1 (via a unidirectional relationship), and user pool 8 has access privileges to vaults 5 and 8 (via a bidirectional relationship). Because user pool 5 has access privileges to vaults 5 and 8 and user pool 1 has access privileges to vault 5, user pool 1's access privileges may also be extended to vault 8 based on vault 5's bidirectional relationship.

Based on the vault relationships, DSN memory relationships are established. Because vaults 1 and 5 have a unidirectional relationship, DSN memories 1 and 4 also have a relationship. Because vaults 7 and 1 have a unidirectional relationship, DSN memories 1 and 6 also have a relationship. Because vaults 5 and 8 have a bidirectional relationship, DSN memories 4 and 6 also have a relationship. Therefore, creating new users, disabling users, or changing access permissions in an originating DSN extends those same changes to the other one or more DSN memories that are subservient to it. In this way, various hierarchies may be established with multiple intermediate DSN memories that serve as originators of access control information to other DSN memories, but are subservient to other DSN memories. For example, vault 1 in DSN memory 1 is an originator of access information to vault 5 in DSN memory 4 but DSN memory 1 is subservient to DSN memory 6 based on vault 1's relationship with vault 7. However, DSN memory 6 is affiliated with vault 8 in which vault 1 has access to via its unidirectional relationship with vault 5. Therefore, DSN memory 1 may be an originating DSN to DSN memory 4, but DSN memory 1 is both an originating and subservient DSN to DSN 6 because of vault 1's relationships with vault 8 (via vault 5) and vault 7.

FIG. 14 is a schematic block diagram of an example of logical storage vault relationships. This example shows the relationships between entity #1 vaults as described with reference to FIG. 13. Vault 1 is within DSN memory 1 and is in a unidirectional relationship with vault 5 within DSN memory 4. Vault 1 is the originating vault and sends updated access control information regarding user pool 1 to vault 5 so that user pool 1 may access both vault 1 and vault 5. Vault 5 sends changes or updates to a vault 5 storage unit credential to the managing unit so that vault 1 may access the storage units affiliated with vault 5. Vault 4 is within DSN memory 3 and is isolated.

Vault 7 is within DSN memory 6 and is in a unidirectional relationship with vault 1 within DSN memory 1. Vault 7 is the originating vault and sends updated access control information regarding user pool 7 to vault 1 so that user pool 7 may access both vault 7 and vault 1. Vault 1 sends changes or updates to a vault 1 storage unit credential to the managing unit so that vault 7 may access the storage units affiliated with vault 1. Vault 5 is within DSN memory 4 and is in a bidirectional relationship with vault 8 within DSN memory 6. Vaults 5 and 8 are both originating vaults and both send updated access control information regarding their affiliated user pools (user pool 5 and user pool 8) back and forth so that their users may access both vault 5 and vault 8. Both vaults 5 or 8 send changes or updates to a storage unit credential to the other vault so they both can continue to access each other's the storage units.

Figure 15:
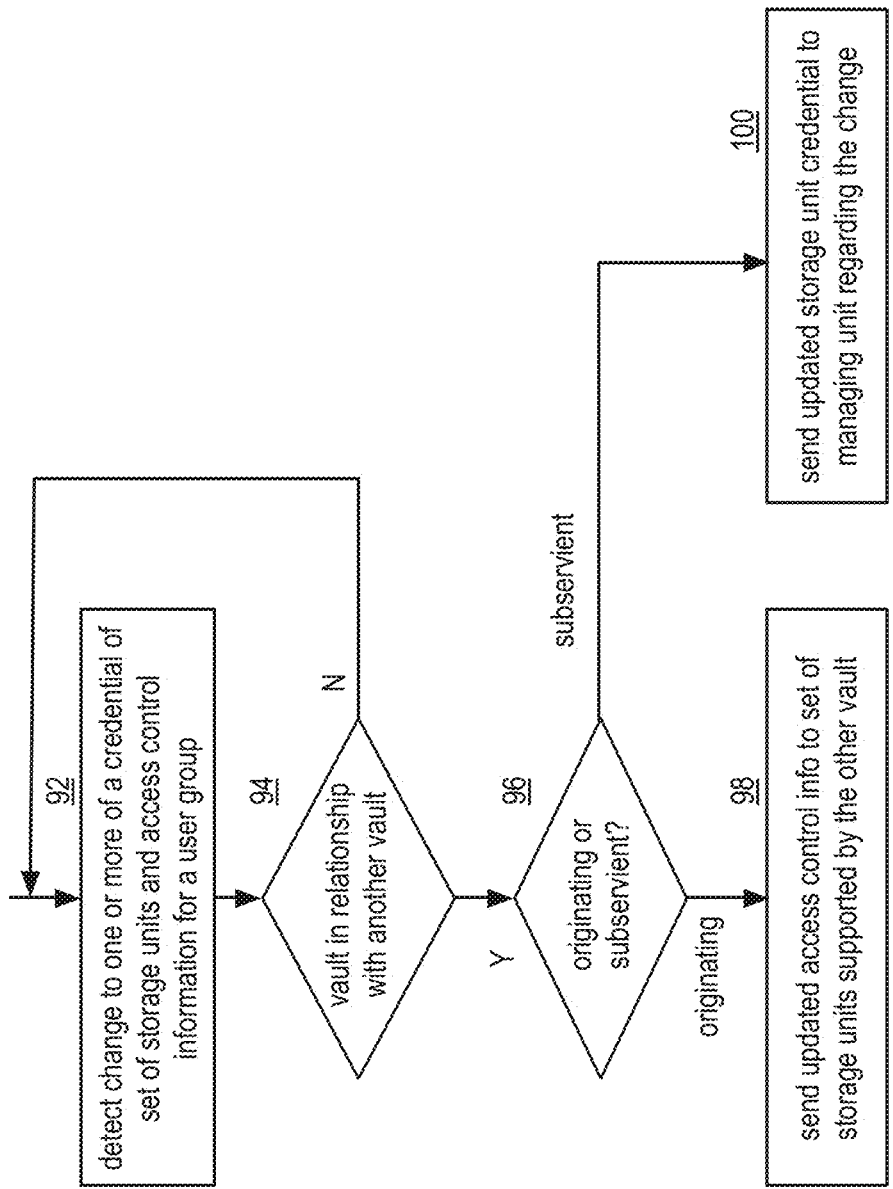
FIG. 15 is a flowchart illustrating an example of updating access control information and credentials based on vault relationships in accordance with the present invention.

FIG. 15 is a flowchart illustrating an example of updating access control information and credentials based on vault relationships. The method begins with step 92 where a computing device (e.g., a managing unit of one or more DSNs) detects a change to one or more of a credential of set of storage units supporting a logical storage vault and access control information for a user group affiliated with the logical storage vault. Logical storage vaults may be owned by the same entity (e.g., a public service or a private company) or entities and may wish to synchronize access controls and credentials between logical storage vaults. Storage unit credentials may include one or more of a signed certificate, a key, an authorization token, a user name and password pair, an authorization time frame indicator, a permission list, a type of services granted, and an encryption key. Access control information includes one or more of authentication information, permission regarding one or more of storing data, reading data, deleting data, and retrieving a list of slice names, and one or more security parameters. For example, the computing device may detect that a new user was added to a user group, a user was disabled, or access permissions were altered in some way. The security parameters may include encryption/decryption scheme, one or more encryption keys, key generation scheme, and/or data encoding/decoding scheme.

In response to the detecting, the method continues with step 94 where the computing device determines whether the logical storage vault is in a relationship with another logical storage vault where the other logical storage vault is supported by a second set of storage units. The determination may be done through a lookup. The set of storage units may be affiliated with a first dispersed storage network (DSN) of a plurality of DSNs, and the second set of storage units may be affiliated with a second DSN of a plurality of DSNs. Alternatively, the second set of storage units and the set of storage units may be within the same DSN. Three logical storage vault relationships can exist: 1) fully isolated, 2) unidirectional, and 2) bidirectional. A fully isolated logical storage vault is neither an originating nor a subservient vault. Therefore, if the managing unit detects a change in the access control information or the storage unit credentials of an isolated vault, the isolated vault would not forward updated information to any other vault.

In a unidirectional relationship, one logical storage vault (an originating storage vault) is permitted to access another logical storage vault but the relationship is not reciprocal (i.e., the other logical storage vault (a subservient vault) cannot similarly access the originating logical storage vault). The managing unit may determine that the logical storage vault is the originating vault when, in accordance with the unidirectional relationship, a group of user devices affiliated with the logical storage vault have access privileges to the other logical storage vault. The managing unit may determine that the logical storage vault is the subservient vault when, in accordance with the unidirectional relationship, a second group of user devices affiliated with the other logical storage vault have access privileges to the logical storage vault.

In a bidirectional relationship, a logical storage vault is determined to be both the originating vault and the subservient vault in relation to the another vault. A logical storage vault is determined to be both the originating vault and the subservient vault when a group of user devices affiliated with the logical storage vault have access privileges to the other logical storage vault and a second group of user devices affiliated with the other logical storage vault have access privileges to the logical storage vault. Therefore, in a bidirectional relationship, a logical storage vault may access the other logical storage vault and the other logical storage can likewise access the logical storage vault.

If the computing device determines that the logical storage vault is not in a relationship with another logical storage vault (e.g., the logical storage vault is isolated), the method goes back to step 92. When the logical storage vault is in the relationship with the other logical storage vault, the method continues with step 96 where the computing device determines whether the logical storage vault is an originating vault or a subservient vault with respect to the other logical storage vault. The computing device may determine that the logical storage vault is in multiple relationships with other storage vaults. In that case, the computing device will determine whether the logical storage vault is an originating or subservient vault in accordance with each relationship.

When the logical storage vault is the originating vault, the method continues with step 98 where the set of storage units sends updated access control information to the second set of storage units regarding a change to the access control information. This allows the users of the originating vault to access the other vault. When the logical storage vault is a second originating vault (in accordance with a second relationship with a second other logical storage vault, where the second other logical storage vault is supported by a third set of storage units) the set of storage units will send the updated access control information to a third set of storage units.

When the logical storage vault is the subservient vault, the method continues with step 100 where the set of storage units sends an updated credential of the set of storage units to the computing device regarding a change to the credential of the set of storage units. This allows for the users of the originating vault to access the subservient vault using credentials of the storage units. When the logical storage vault is the second subservient vault (in accordance with a second relationship) the computing device utilizes the updated credential for data access requests in accordance with the second relationship.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   detecting, by a computing device, a change to one or more of: a credential pertaining to grant or deny access by a first user group of a first set of storage units supporting a logical storage vault to which the first user group has access and access control information pertaining to the access of the logical storage vault for the first user group having access to the logical storage vault; and
   in response to the detecting:
      determining, by the computing device, whether the logical storage vault is in a relationship with another logical storage vault to which a second user group has access, wherein the other logical storage vault is supported by a second set of storage units;
      when the logical storage vault is in the relationship with the other logical storage vault, determining, by the computing device, whether the logical storage vault is an originating vault or a subservient vault with respect to the other logical storage vault;
      when the logical storage vault is the originating vault, receiving, by the computing device, from the first set of storage units updated access control information pertaining to access of the logical storage vault by the first user group and sending, by the computing device, to the second set of storage units the updated access control information, wherein the updated access control information is regarding a change to the access control information; and
      when the logical storage vault is the subservient vault, receiving, by the computing device, from the first set of storage units an updated credential pertaining to access of the logical storage vault by the first user group of the first set of storage units regarding a change to the credential of the first set of storage units.

2. The method of claim 1, wherein the credential comprises one or more of:
   a signed certificate;
   a key;
   an authorization token;
   a user name and password pair;
   an authorization time frame indicator;
   a permission list;
   a type of services granted; and
   an encryption key.

3. The method of claim 1, wherein the access control information comprises one or more of:
   authentication information;
   permission regarding one or more of storing data, reading data, deleting data, and retrieving a list of slice names; and
   one or more security parameters.

4. The method of claim 1 further comprises:
   determining that the logical storage vault is in a unidirectional relationship with the other logical storage vault;
   determining that the logical storage vault is the originating vault when, in accordance with the unidirectional relationship, a group of user devices of the first user group having access to the logical storage vault have access privileges to the other logical storage vault; and
   determining that the logical storage vault is the subservient vault when, in accordance with the unidirectional relationship, a group of user devices of the second user group having access to the other logical storage vault have access privileges to the logical storage vault.

5. The method of claim 1 further comprises:
   determining that the logical storage vault is in a bidirectional relationship with the other logical storage vault; and
   determining that the logical storage vault is both the originating vault and the subservient vault when, in accordance with the bidirectional relationship, a group of user devices of the first user group having access to the logical storage vault have access privileges to the other logical storage vault and a group of user devices of the second user group having access to the other logical storage vault have access privileges to the logical storage vault.

6. The method of claim 1 further comprises:
   in response to the detecting:
      determining, by the computing device, whether the logical storage vault is in a second relationship with a second other logical storage vault to which a third user group has access, wherein the second other logical storage vault is supported by a third set of storage units;
      when the logical storage vault is in the second relationship with the second other logical storage vault, determining whether the logical storage vault is a second originating vault or a second subservient vault with respect to the second other logical storage vault;
   when the logical storage vault is the second originating vault, receiving, by the computing device, from the first set of storage units, the updated access control information and sending, by the computing device, the updated access control information to the third set of storage units; and
   when the logical storage vault is the second subservient vault, utilizing, by the computing device, the updated credential for data access requests in accordance with the second relationship.

7. The method of claim 1, wherein
   the first set of storage units is affiliated with a first dispersed storage network (DSN) of a plurality of DSNs; and
   the second set of storage units is affiliated with a second DSN of the plurality of DSNs.

8. A computer readable memory comprises:
   a first memory that stores operational instructions that, when executed by a computing device, cause the computing device to:
      detect a change to one or more of: a credential pertaining to grant or deny access by a first user group of a first set of storage units supporting a logical storage vault to which the first user group has access and access control information pertaining to the access of the logical storage vault for the first user group having access to the logical storage vault; and
   a second memory that stores operational instructions that, when executed by the computing device, cause the computing device to:
      in response to the detecting
         determine whether the logical storage vault is in a relationship with another logical storage vault to which a second user group has access, wherein the other logical storage vault is supported by a second set of storage units; and
         when the logical storage vault is in the relationship with the other logical storage vault, determine whether the logical storage vault is an originating vault or a subservient vault with respect to the other logical storage vault; and a third memory that stores operational instructions that, when executed by the first set of storage units, cause the first set of storage units to:
    when the logical storage vault is the originating vault, send updated access control information pertaining to the access of the logical storage vault to the second set of storage units regarding a change to the access control information; and
    when the logical storage vault is the subservient vault, send an updated credential of the first set of storage units to the computing device regarding a change to the credential of the first set of storage units.

9. The computer readable memory of claim 8, wherein the credential comprises one or more of:
    a signed certificate;
    a key;
    an authorization token;
    a user name and password pair;
    an authorization time frame indicator;
    a permission list;
    a type of services granted; and
    an encryption key.

10. The computer readable memory of claim 8, wherein the access control information comprises one or more of:
    authentication information;
    permission regarding one or more of storing data, reading data, deleting data, and retrieving a list of slice names; and
    one or more security parameters.

11. The computer readable memory of claim 8, wherein the second memory further stores operational instructions that, when executed by the computing device, cause the computing device to:
    determine that the logical storage vault is in a unidirectional relationship with the other logical storage vault;
    determine that the logical storage vault is the originating vault when, in accordance with the unidirectional relationship, a group of user devices of the first user group having access to the logical storage vault have access privileges to the other logical storage vault; and
    determine that the logical storage vault is the subservient vault when, in accordance with the unidirectional relationship, a group of user devices of the second user group having access to the other logical storage vault have access privileges to the logical storage vault.

12. The computer readable memory of claim 8, wherein the second memory further stores operational instructions that, when executed by the computing device, cause the computing device to:
    determine that the logical storage vault is in a bidirectional relationship with the other logical storage vault; and
    determine that the logical storage vault is both the originating vault and the subservient vault when, in accordance with the bidirectional relationship, a group of user devices of the first user group having access to the logical storage vault have access privileges to the other logical storage vault and a group of user devices of the second user group having access to the other logical storage vault have access privileges to the logical storage vault.

13. The computer readable memory of claim 8 further comprises:
    the second memory further stores operational instructions that, when executed by the computing device, cause the computing device to:
        in response to the detecting:
            determine whether the logical storage vault is in a second relationship with a second other logical storage vault, wherein the second other logical storage vault is supported by a third set of storage units to which a third user group has access; and
            when the logical storage vault is in the second relationship with the second other logical storage vault, determine whether the logical storage vault is a second originating vault or a second subservient vault with respect to the second other logical storage vault;
    the third memory further stores operational instructions that, when executed by the first set of storage units, cause the first set of storage units to:
        when the logical storage vault is the second originating vault, send the updated access control information to the third set of storage units; and
    a fourth memory that stores operational instructions that, when executed by the computing device, cause the computing device to:
        when the logical storage vault is the second subservient vault, utilize the updated credential for data access requests in accordance with the second relationship.

14. The computer readable memory of claim 8, wherein
    the first set of storage units is affiliated with a first dispersed storage network (DSN) of a plurality of DSNs; and
    the second set of storage units is affiliated with a second DSN of the plurality of DSNs.

* * * * *